United States Patent [19]

Luce et al.

[11] 4,235,978

[45] Nov. 25, 1980

[54] FLAME RETARDANT COMPOSITION

[75] Inventors: John B. Luce, Mt. Vernon, Ind.; Howard A. Vaughn, Jr., Schenectady, N.Y.

[73] Assignee: General Electric Company, Pittsfield, Mass.

[21] Appl. No.: 582,770

[22] Filed: Jun. 2, 1975

Related U.S. Application Data

[63] Continuation-in-part of Ser. No. 407,649, Oct. 18, 1973, abandoned.

[51] Int. Cl.$^3$ ...................... C08L 69/00; C08L 53/06
[52] U.S. Cl. ............................ 525/101; 260/45.75 B
[58] Field of Search ........... 260/827, 45.75 B, 47 XA, 260/827; 525/101

[56] References Cited

U.S. PATENT DOCUMENTS

| | | | |
|---|---|---|---|
| 3,121,069 | 2/1964 | Dietz | 260/827 |
| 3,239,579 | 3/1966 | Barber et al. | 260/827 |
| 3,334,154 | 8/1967 | Kim | 260/860 |
| 3,505,253 | 4/1970 | Finestone et al. | 260/2.5 |
| 3,879,491 | 4/1975 | Lindsey et al. | 260/827 |
| 3,923,923 | 12/1975 | Fiedler | 260/827 |

*Primary Examiner*—Paul Lieberman
*Attorney, Agent, or Firm*—Salvatore Mitri

[57] ABSTRACT

A flame retardant composition comprising in admixture, a thermoplastic polymer, a flame-retardant additive and a minor amount of an organopolysiloxane polymer.

7 Claims, No Drawings

FLAME RETARDANT COMPOSITION

This application is a continuation-in-part application of patent application Ser. No. 407,649 filed Oct. 18, 1973, and now abandoned.

This invention is directed to a flame-retardant composition comprising in admixture a thermoplastic polymer, a flame-retardant additive and a minor amount of an organopolysiloxane polymer.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

It is known to use organopolysiloxane in admixture with polycarbonates to provide a composition having good mold release properties from U.S. Pat. No. 2,999,835. Also, U.S. Pat. No. 3,087,908 discloses resinous material comprising organosiloxane in admixture with polycarbonates, which composition facilitates the formation of clear films which are free from blemishes, undesirable color effects, bubbles, and craters.

However, none of the above references disclose that when a minor amount of a particular organopolysiloxane polymer is mixed with a thermoplastic polymer and a flame retardant additive, the thermoplastic polymer is rendered flame retardant.

The organopolysiloxane polymer additive is able to stop the dripping of molten, flame particles from burning thermoplastic parts. In the case of self-extinguishing polymers, these materials can be ignited and do burn as long as the ignition source is present but extinguish themselves within a few seconds after its removal. However, during the burning period, before flame-out, the self-extinguishing polymer tends to drip molten flaming fragments which will ignite other material situated below the first fire. Howvever, the instant additive in admixture with the aromatic polycarbonate prevents this dripping of molten, flaming particles.

DESCRIPTION OF THE INVENTION

This invention relates to a flame-retardant composition comprising in admixture (A) an alkenylaromatic polymer; (B) a flame-retardant additive and (C) a minor amount of a diorganopolysiloxane polymer wherein the organo substituents therein are selected from the group consisting of alkyl, aryl and vinyl radicals and mixtures thereof. The amount of organopolysiloxane polymer can vary but preferably is present in from 0.5 to about 5.0 weight percent based on the weight of the alkenylaromatic polymer.

The diorganopolysiloxane polymers employed in the practice of this invention are gums which have a viscosity of from about 10,000,000 to about 100,000,000 centistokes and preferably from about 80,000,000 to 100,000,000 centistokes. These high molecular weight diorganopolysiloxane polymers are prepared by methods known in the art, as for example, by the methods set forth in U.S. Pat. Nos. 2,445,794; 2,448,756; 2,484,595 and 3,514,424. The diorganopolysiloxane polymers of the present invention consist essentially of silicon atoms, oxygen atoms and organic groups selected from the group consisting of alkyl such as lower alkyl, aryl such as phenyl, and substituted phenyl such as tetrachloro phenyl radicals, etc. and vinyl radicals and mixtures thereof. Preferably, the organic groups are selected from the group consisting of methyl, phenyl and vinyl radicals. From 0 to 35 mole percent of the organic groups being silicon-bonded aryl radicals, preferably phenyl radicals and from 0 to 2 mole percent of the organic groups being silicon-bonded vinyl radicals.

The "alkenylaromatic polymers" of the present invention include polymers consisting of styrene. The styrene polymer may be either a styrene homopolymer or a styrene copolymer of at least 50 weight percent of styrene with the balance being any other monomer copolymerizable with styrene monomer. This also includes the high impact polystyrenes which are prepared by polymerizing styrene in the presence of polybutadiene to graft copolymerize the polybutadiene onto the styrene polymer chain that is formed during polymerization of the styrene monomer. Also included are the styrenebutadiene block and random copolymers wherein the butadiene may be present in an amount of from 10–50 weight percent of the styrene polymer.

Also, alkenylaromatic polymers include a terpolymer of a vinyl aromatic-acrylonitrile-butadiene. Additionally, alkenyl-aromatic compounds such as α-methylstyrene, the mono-, di-, tri-, tetra- and penta-chlorostyrenes and α-methylstyrenes, and the nuclearly alkylated styrenes and α-alkylstyrenes such as ortho- and para-methylstyrenes, ortho- and paraethylstyrene, ortho- and para-methyl-α-methylstyrene and the like may be copolymerized with acrylonitrile, butadiene, and the like. Alternatively, the alkenylaromatic polymers can include a blend of a vinyl aromatic-acrylonitrile copolymer and a vinyl aromatic-butadiene copolymer. These can range from 10–90 weight percent of either constituent of the copolymer blend. Preferably, however, a 50—50 weight percent is desirable.

The flame-retardant additives which may be added to the thermoplastic resin comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with an organic or inorganic antimony compound, e.g., antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive that may be used will be from about 10 to about 30 parts by weight per hundred parts of resin. Synergists, e.g., inorganic or organic antimony compounds, such as antimony oxide, will be used at about 1 to 10 parts by weight per 100 parts of resin.

Among the useful halogen-containing compounds are those of the formula

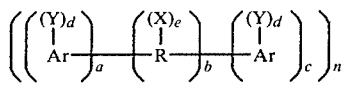

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; a sulfur-containing linkage, e.g., sulfide, sulfoxide, sulfone, thiocarbonate; a phosphorus-containing linkage, and the like. R can also consist of two or more alkylene or alkylidene linkages connected by such groups as aromatic, ether, ester, carbonyl, sulfide, sulfoxide, sulfone, a phosphorus-containing linkage, and the like. R can be derived from a dihydric phenol, e.g., bis-phenol-A, and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) hydroxy or ether groups of the general formula OE, wherein E is hydrogen or a monovalent hydrocarbon radical similar to X or (3) monovalent hydrocarbon groups of the type represented by R or (4) other substituents, e.g., cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, chclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-to-carbon bond.

The Y substituents on the aromatic groups, Ar and Ar' can be varied in the ortho, metal or para positions on the aromatic rings and the groups can be in any possible geometric relationship with respect to one another.

Included within the scope of the bisphenols included in the above formula are the following:
2,2-bis (4-hydroxy, 3,5-dichlorophenyl)propane
bis (4-hydroxy, 3-chlorophenyl)methane
bis (4-hydroxy, 3,5-dibromophenyl)methane
1,2-bis (4-hydroxy, 3,5-dichlorophenyl)ethane
1,1-bis (4-hydroxy, 3,5-dichlorophenyl)ethane
3,3-bis (4-hydroxy, 3,5-dichlorophenyl)pentane
bis (4-hydroxy, 3,5-dichlorophenyl)cyclohexylmethane The preparation of these and other applicable bisphenols are known in the art. In place of the divalent aliphatic group in the above examples may be substituted sulfide, sulfoxy and the like.

Included within the above structural formula are substituted benzenes exemplified by tetrabromobenze,e hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

A preferred flame-retardant additive which may be included within this invention is a copolycarbonate which is derived from a halogen-substituted dihydric phenol and a dihydric phenol, said halogen preferably being chlorine or bromine. Preferably, this copolycarbonate is the product of a halogenated bisphenol-A such as tetrabromobisphenol-A and tetrachlorobisphenol-A and a dihydric phenol such as bisphenol-A. Preferably, this copolycarbonate consists of 75 to 25 weight percent of the product of tetrabromobisphenol-A and, correspondingly, 25 to 75 weight percent of the product of bisphenol-A based on the weight of the copolycarbonate. The preparation of this copolycarbonate is set forth in U.S. Pat. No. 3,334,154 which is incorporated herein by reference.

Another preferred flame-retardant additive which may be included within this invention is low molecular weight polymers of a carbonate of a halogenated dihydric phenol. Such polymers may contain from 2 to 10 repeating units of the formula

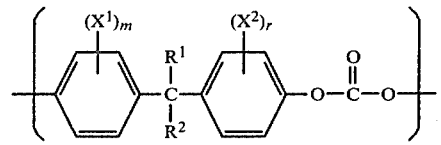

wherein $R^1$ and $R^2$ are hydrogen, (lower)alkyl or phenyl, $X^1$ and $X^2$ are bromo or chloro and m and r are from 1 to 4. The polymeric additives will have a low volatility when heated above 200° C., and a softening point of less than about 300° C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably a monohydric phenol, and most preferably a halogenated phenol and phosgene or a reactive derivative thereon in the presence of an acid acceptor, e.g., an amine or caustic. Details concerning the preparation and use of such compounds are given in the copending patent application of Daniel W. Fox, "Flame Retardant Compounds and Thermoplastic Compositions Containing the Same", Ser. No. 194,518, filed on Nov. 1, 1971 and incorporated herein by reference.

Another preferred additive can be made by polymerizing a mixture of tetrabromobisphenol-A and 2,4,6-tribromophenol with phosgene in either methylene chloride in the presence of pyridine or in methylene chloride containing triethylamine in admixture with an aqueous caustic phase. The product of such a process will be a polymer of the formula:

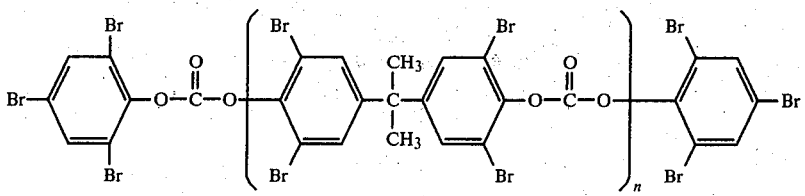

wherein the average number of repeating units, n, will be from about 3 to about 7, and the softening point will be in the range of from 200° to 260° C.

Inorganic and organic antimony compounds are widely available or can be made in known ways. In preferred embodiments, the type of antimony compound used is not critical, being a choice primarily based on economics. For example, as inorganic antimony compounds there can be used antimony oxide, ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids, and the like. Illustrative of the organic antimony compounds, including inorganic salts of such compounds are: KSb tartrate, Sb caproate; $Sb(OCH_2CH_3)_3$; $Sb(OCH(CH_3)CH_2CH_3)_3$; Sb polymethylene glycolate; triphenyl antimony; and the like. Especially preferred is antimony oxide.

It is also regarded to be among the features of this invention to include in the compositions, other ingredients, such as fillers, mold release agents, pigments, stabilizers, nucleating agents, and the like, in conventional amounts for their conventionally employed purposes.

The manner of adding the flame retardant additives, and the diorganopolysiloxane polymer to the thermoplastic resin is not critical; is conventional; and will be obvious to those skilled in the art. This composition is passed through an extruder at a temperature dependent on the needs of the particular compositions. The resulting extrudate is comminuted into pellets or other suitable shapes. This mixture is then fed into a conventional molding machine which produces a molded product.

DESCRIPTION OF THE PREFERRED EMBODIMENT

The following Examples are set forth to illustrate more clearly the principle and practice of this invention to those skilled in the art. Unless otherwise specified, where parts or percents are mentioned, they are parts or percents by weight.

EXAMPLE I 75 parts by weight of an acrylonitrile-butadiene-styrene terpolymer (40, 20 and 40 weight percent, respectively) are blended with 20 parts by weight of resin of poly (2,2-bis (3,5-dibromo-4-hydroxyphenyl)propane carbonate) terminated with tribromophenoxy groups (having about 5 repeating units and prepared by reacting 0.06 moles of tetrabromobisphenol-A, 0.02 moles of tribromophenol and phosgene in methylene chloride and pyridine), and 5 parts by weight of antimony oxide. The mixture is then fed into an extruder, and the extrudate is comminuted into pellets. The pellets are then injection molded into test bars which are 0.090"×0.500"×5". These bars are then subjected to the Underwriters Laboratories Subject 94 flame test. The results are given in the TABLE.

EXAMPLE II 75 parts by weight of an acrylonitrile-butadiene-styrene terpolymer (40, 20 and 40 weight percent, respectively) are blended with 20 parts by weight of resin of poly(2,2-bis(3,5-dibromo-4-hydroxyphenyl)propane carbonate) terminated with tribromophenoxy groups (having about 5 repeating units and prepared by reacting 0.06 moles of tetrabromobisphenol-A, 0.02 moles of tribromophenol and phosgene in methylene chloride and pyridine), and 5 parts by weight of antimony oxide. To this is added by dry blending 1.5 parts by weight of high molecular weight methyl phenyl vinyl siloxane. The mixture is extruded into test bars as in Example I and subjected to the UL-94 flame test. The results are given in the TABLE.

EXAMPLE III

Example II is repeated except that 2.5 parts by weight of high molecular weight methyl phenyl vinyl siloxane is added instead of 1.5 parts by weight. The mixture is extruded into test bars as in Example I and subjected to the UL-94 flame test. The restuls are given in the TABLE.

EXAMPLE IV 70 parts by weight of an acrylonitrile-butadiene-styrene terpolymer (40, 20 and 40 weight percent, respectively) are blended with 25 parts by weight of resin of poly (2,2-bis(3,5-dibromo-4-hydroxyphenyl)propane carbonate) terminated with tribromophenoxy groups (having about 5 repeating units and prepared by reacting 0.06 moles of tetrabromobisphenol-A, 0.02 moles of tribromophenol and phosgene in methylene chloride and pyridine), and 5 parts by weight of antimony oxide. To this is added by dry blending 1.5 parts by weight of high molecular weight methyl phenyl vinyl siloxane. The mixture is extruded into test bars as in Example I and subjected to the UL-94 flame test. The results are given in the TABLE.

EXAMPLE V

Example I is repeated except that high impact polystyrene is used instead of the acrylonitrile-butadiene-styrene terpolymer. The mixture is extruded into test bars as in Example I and subjected to the UL-94 flame test. The results are given in the TABLE.

EXAMPLE VI

Example III is repeated except that high impact polystyrene is used instead of the acrylonitrile-butadiene-styrene terpolymer. The mixture is extruded into test bars as in Example I and subjected to the UL-94 flame test. The results are given in the TABLE.

EXAMPLE VII

Example IV is repeated except that high impact polystyrene is used instead of the acrylonitrile-butadiene-styrene terpolymer. The mixture is extruded into test bars as in Example I and subjected to the UL-94 flame test. The results are given in the TABLE.

EXAMPLE VIII

Example IV is repeated except that the additive is a diphenyl dimethyl siloxane fluid (viscosity 190 centistokes) instead of the methyl phenyl vinyl siloxane. The mixture is extruded into test bars as in Example I and subjected to the UL-94 flame test. The results are given in the TABLE.

EXAMPLE IX

Example VI is repeated except that the additive is a diphenyl dimethyl siloxane fluid (viscosity 190 centistokes) instead of the methyl phenyl vinyl siloxane. The mixture is extruded into test bars as in Example I and subjected to the UL-94 flame test. The results are given in the TABLE.

EXAMPLE X

Example IV is repeated except that the additive is a dimethyl silicone fluid containing 3 mole percent tetrachlorophenyl siloxy units, the remainder being methyl substituents and containing trimethyl siloxy chain stopping units (viscosity 70 centistokes) instead of the methyl phenyl vinyl siloxane additive. The mixture is extruded into test bars as in Example I and subjected to the UL-94 flame test. The results are given in the TABLE.

EXAMPLE XI

Example VI is repeated except that the additive is a dimethyl silicone fluid containing 3 mole percent tetrachlorophenyl siloxy units, the remainder being methyl substituents and containing trimethyl siloxy chain stopping units (viscosity 70 centistokes) instead of the methyl phenyl vinyl siloxane additive. The mixture is extruded into test bars as in Example I and subjected to the UL-94 flame test. The results are given in the TABLE.

The test bars of the Examples are evaluated in accordance with the test procedure of Underwriters Laboratories, Inc. Standard UL-94, September, 1972, Vertical Burning Test for Classifying Materials. In accordance with the test procedure, materials are classified as either SE-O, SE-I or SE-II. The results are based on 5 specimens, each supported vertically. The criteria for SE rating per UL-94 is briefly as follows:

"SE-O":
  Average flaming and/or glowing after removal of the igniting flame shall not exceed 5 seconds and none of the specimens burn for longer than 10 seconds nor shall drip flaming particles which ignite absorbent cotton that is placed 12 inches below the specimen.

"SE-I":
  Average flaming and/or glowing after removal of the igniting flame shall not exceed 25 seconds and no one sample shall exceed 30 seconds nor shall the specimen drip flaming particles that ignite absorbent cotton that is placed 12 inches below the specimen.

"SE-II":
  Average flaming and/or glowing after removal of the igniting flame shall not exceed 25 seconds and no one sample shall exceed 30 seconds but the specimens may drip flaming particles which ignite absorbent cotton.

Further, UL-94 states that if only one specimen from a set of five specimens fails to comply with the requirements, another set of five specimens shall be tested. All specimens from this second set shall comply with the appropriate requirements in order for the material in that thickness to be classified "SE-O", "SE-I" or "SE-II".

TABLE

| Sample | UL-94 Classification |
|---|---|
| Example I | SE-II |
| Example II | SE-I |
| Example III | SE-I |
| Example IV | SE-0 |
| Example V | SE-II |
| Example VI | SE-I |
| Example VII | SE-I |
| Example VIII | SE-II |
| Example IX | SE-II |
| Example X | SE-II |
| Example XI | SE-II |

As seen by the Examples, the composition of the instant invention is classified as either SE-I or SE-O while the compositions with no additive (Examples I and V) and the compositions with a low molecular weight polysiloxane (Examples VIII to XI) are classified as SE-II when tested by the procedure of the UL-94 test.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A flame-retardant, non-dripping composition comprising in admixture
   (A) an alkenylaromatic polymer;
   (B) a flame retardant additive in an amount of from about 10 to about 30 parts by weight per hundred parts resin, said flame retardant additive being either (i) a low molecular weight polymer of a carbonate of a halogenated dihydric phenol, said polymer containing from 2 to 10 repeating units of the formula

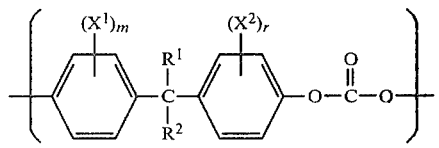

wherein $R^1$ and $R^2$ are hydrogen, (lower) alkyl or phenyl, $X^1$ and $X^2$ are bromo or chloro and m and r are from 1 to 4, said polymer having low volatility when heated above about 200° C., and a softening point of less than about 300° C., or (ii) a combination of said polymer (i) and an inorganic or organic antimony-containing compound; and, (C) from 0.5 to about 5.0 weight percent based on the weight of the alkenylaromatic polymer of a diorganopolysiloxane polymer gum having a viscosity of from about 10,000,000 to about 100,000,000 centistokes and wherein the organo substituents therein are selected from the group consisting of alkyl, aryl and vinyl radicals and mixtures thereof.

2. The composition of claim 1 wherein the alkenylaromatic polymer is a styrene polymer of at least 50 weight percent of styrene.

3. The composition of claim 1 wherein the styrene polymer is a copolymer of 50 weight percent of styrene and, correspondingly, 50 weight percent of butadiene.

4. The composition of claim 1 wherein the alkenylaromatic polymer is a vinyl aromatic-acrylonitrile-butadiene terpolymer.

5. The composition of claim 1 wherein said flame retardant additive (i) is of the formula

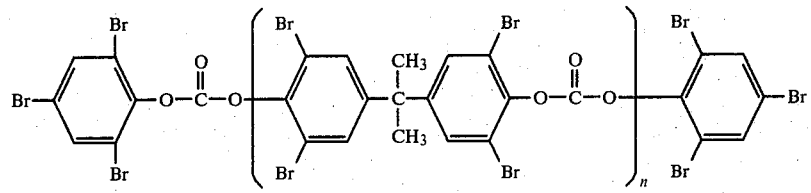

wherein the average number of repeating units, n, is from about 3 to 7, and the softening point of said polymer is in the range of from 200° to 260° C.

6. The composition of claim 1 wherein the organopolysiloxane polymer has a viscosity of from about 80,000,000 to 100,000,000 centistokes.

7. The composition of claim 1 wherein the diorganopolysiloxane polymer contains methyl, phenyl and vinyl groups.

* * * * *